United States Patent
Funnell et al.

(10) Patent No.: US 10,657,032 B2
(45) Date of Patent: May 19, 2020

(54) SYSTEMS AND METHODS FOR MONITORING PERFORMANCE OF APPLICATIONS

(71) Applicant: Atlassian Pty Ltd, Sydney (AU)

(72) Inventors: Colby David Funnell, Sydney (AU); Haitao Li, Sydney (AU); Wen Qiang Calvin Ng, Sydney (AU)

(73) Assignee: ATLASSIAN PTY LTD, Sydney, New South Wales (AU)

( * ) Notice: Subject to any disclaimer, the term of this patent is extended or adjusted under 35 U.S.C. 154(b) by 0 days.

(21) Appl. No.: 16/108,062

(22) Filed: Aug. 21, 2018

(65) Prior Publication Data
US 2019/0303274 A1   Oct. 3, 2019

Related U.S. Application Data

(60) Provisional application No. 62/650,885, filed on Mar. 30, 2018.

(51) Int. Cl.
| | |
|---|---|
| *G06F 11/36* | (2006.01) |
| *G06F 11/34* | (2006.01) |
| *G06F 16/783* | (2019.01) |

(52) U.S. Cl.
CPC ...... *G06F 11/3664* (2013.01); *G06F 11/3409* (2013.01); *G06F 11/3414* (2013.01);
(Continued)

(58) Field of Classification Search
CPC ............ G06F 11/3409; G06F 11/3476; G06F 11/3664; G06F 11/3668; G06F 11/3672;
(Continued)

(56) References Cited

U.S. PATENT DOCUMENTS

| | | | | |
|---|---|---|---|---|
| 9,047,410 B2* | 6/2015 | Markande | ........... | G06F 11/3688 |
| 9,348,727 B1* | 5/2016 | Cai | ..................... | G06F 11/3664 |

(Continued)

OTHER PUBLICATIONS

Asrese, A., et al., WePR: A Tool for Automated Web Performance Measurement, IEEE Globecom Workshops (GC Wkshps), Dec. 4-8, 2016, 6 pages, [retrieved on Oct. 30, 2019], Retrieved from the Internet.*

*Primary Examiner* — Geoffrey R St Leger
(74) *Attorney, Agent, or Firm* — Hickman Palermo Becker Bingham LLP (57) ABSTRACT

Embodiments of the present invention provide a system and method for monitoring an application hosted on a server. The method includes receiving a test request at a monitoring system, the test request including information about a synthetic test to be performed on an application and a test script for performing the test. The method further includes scheduling a monitoring task based on the test request, the monitoring task comprising information about a test start time and in response to determining a scheduled monitoring task is ready for execution, automatically launching a client application, retrieving the test script and automatically executing the test script in the client application. The method further includes automatically recording in real time, the state of the user interface of the client application while executing the test script, generating a video file of the recording, and upon ending of the monitoring task, transmitting the video file to a client device.

16 Claims, 8 Drawing Sheets

(52) U.S. Cl.
CPC ...... *G06F 11/3476* (2013.01); *G06F 11/3668* (2013.01); *G06F 11/3672* (2013.01); *G06F 11/3684* (2013.01); *G06F 11/3688* (2013.01); *G06F 11/3692* (2013.01); *G06F 11/3696* (2013.01); *G06F 16/7837* (2019.01); *G06F 2201/815* (2013.01)

(58) Field of Classification Search
CPC ............. G06F 11/3684; G06F 11/3688; G06F 11/3692; G06F 11/3696; G06F 16/7837
USPC .................................................. 717/124–128
See application file for complete search history.

(56) References Cited

U.S. PATENT DOCUMENTS

| | | | |
|---|---|---|---|
| 9,848,072 B2* | 12/2017 | Kang | G06F 21/31 |
| 10,136,163 B2* | 11/2018 | Zhou | H04N 19/172 |
| 10,203,976 B2* | 2/2019 | Mao | G06F 9/45558 |
| 2013/0227350 A1* | 8/2013 | O'riordan | G06F 11/3476 714/45 |
| 2014/0026122 A1* | 1/2014 | Markande | G06F 11/3664 717/124 |
| 2016/0007048 A1* | 1/2016 | Zhou | H04N 19/172 375/240.12 |
| 2016/0266921 A1* | 9/2016 | Mao | G06F 9/45558 |
| 2016/0360298 A1* | 12/2016 | Chalmers | G06F 16/783 |
| 2017/0104861 A1* | 4/2017 | Kang | G06F 21/31 |
| 2017/0337122 A1* | 11/2017 | Bolajwar | G06F 11/34 |
| 2018/0060223 A1* | 3/2018 | Cheung | G06F 11/3688 |
| 2018/0309804 A1* | 10/2018 | Nagy | H04L 5/10 |

\* cited by examiner

502 — STDOUT - 2018-02-04 19:09:10.522360884 +0000 UTC - Check: START
STDOUT - 2018-02-04 19:09:10.572625293 +0000 UTC - Webdriver: INIT
504 — STDOUT - 2018-02-04 19:09:13.288419462 +0000 UTC - Loaded Login page
506 — STDOUT - 2018-02-04 19:09:14.577142587 +0000 UTC - Logging in user...
STDOUT - 2018-02-04 19:09:30.100772304 +0000 UTC -
STDOUT - 2018-02-04 19:09:30.100817064 +0000 UTC - Console logs
STDOUT - 2018-02-04 19:09:30.100822325 +0000 UTC - =====================
STDOUT - 2018-02-04 19:09:30.100826098 +0000 UTC -
STDOUT - 2018-02-04 19:09:30.1008297 +0000 UTC - [ ]
STDOUT - 2018-02-04 19:09:30.100833879 +0000 UTC -
STDOUT - 2018-02-04 19:09:30.100837744 +0000 UTC - =====================
STDOUT - 2018-02-04 19:09:30.100841632 +0000 UTC -
STDOUT - 2018-02-04 19:09:30.105672451 +0000 UTC -
STDOUT - 2018-02-04 19:09:30.105708876 +0000 UTC - Driver logs
STDOUT - 2018-02-04 19:09:30.105713623 +0000 UTC - =====================
STDOUT - 2018-02-04 19:09:30.105717133 +0000 UTC -
STDOUT - 2018-02-04 19:09:30.105720278 +0000 UTC - [ ]
STDOUT - 2018-02-04 19:09:30.105725994 +0000 UTC -
STDOUT - 2018-02-04 19:09:30.105729605 +0000 UTC - =====================
STDOUT - 2018-02-04 19:09:30.105733965 +0000 UTC -
508 — STDOUT - 2018-02-04 19:09:30.137185384 +0000 UTC - Login failed: TimeoutError: Waiting for title to match /^Search \ | Sp lunk/

SYSTEMS AND METHODS FOR MONITORING PERFORMANCE OF APPLICATIONS

BENEFIT CLAIM

This application claims the benefit under 35 U.S.C. § 119(e) of provisional application 62/650,885, filed Mar. 30, 2018, the entire contents of which are hereby incorporated by reference for all purposes as if fully set forth herein.

TECHNICAL FIELD

The present disclosure generally relates to improved systems, methods, computer software and hardware in the field of enterprise productivity applications. The disclosure relates more specifically to improved computer-implemented systems and methods for performance monitoring of applications, and in particular to synthetic transaction monitoring of applications.

BACKGROUND

The approaches described in this background section are not necessarily prior art to the claims in this application and are not admitted as prior art by inclusion in this section.

Application performance monitoring can be of two types—passive and synthetic. In passive monitoring, real-world historical performance of an application (e.g., an application hosted on a server such as a web server or an application server) is typically assessed based on monitoring actual log-ins, site hits, clicks, requests for data and other server transactions.

Synthetic monitoring, on the other hand, is performed by periodically deploying scripted tests that simulate user interactions with an application. A log of the transaction tests is generally saved and administrators can then review the test log to determine whether a test was successful or not. Synthetic monitoring is useful as it allows administrators to test new applications before they are launched, measure the way end users interact with applications (such as websites, APIs or mobile apps), and quickly identify faults. Synthetic monitoring can also provide direct feedback on performance degradation or availability issues allowing administrators to locate the root cause of failures and fix those issues before they impact end users.

As test scripts are periodically deployed in synthetic monitoring to check performance, this type of monitoring is often automated—i.e., programs are utilized to automatically run the tests at predetermined times. One issue that particularly arises because of this automation is that it is difficult to determine whether a particular monitoring test failed because of a fault with the application it was testing or because of a fault with the test itself. This is often referred to as the problem of 'flakey' tests.

SUMMARY

The appended claims may serve as a summary of the invention.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention. Embodiments are described in sections according to the following outline:

1. OVERVIEW
2. EXAMPLE SYSTEM IMPLEMENTATION
3. MONITORING PROCESS
4. TESTING PROCESS
5. VIDEO PROCESSING
6. HARDWARE OVERVIEW

1. Overview

As discussed herein, synthetic monitoring refers to monitoring of server applications—i.e., applications hosted on servers such as web servers, where the application can be accessed via a web browser, or application servers, where the application can be accessed via a dedicated client. Further, synthetic monitoring refers to server application monitoring that is typically done using emulation or scripted recordings of transactions a user may conduct when interacting with the application. When the application is hosted on a web server, the synthetic testing may be done using web browser emulation of web transactions. On the other hand, when the application is hosted on an application server that is not a web server, the synthetic testing may be done using a dedicated client application executing or installed on a user device. In either case, test scripts are created and automatically executed to simulate a path or an action such as logging in to a website/application or performing a transaction on an ecommerce site that an end user would take when interacting with the application. This type of monitoring is helpful in determining the availability of applications and to measure end user experience with these applications. Synthetic test as used herein refers to the actual test that is executed during synthetic monitoring.

As noted previously, an issue with synthetic monitoring is that it is difficult to determine from a failed test result whether the failure was due to a fault in the application being tested or in the test itself. Further, when a test failure message is received, administrators have to typically review a log of the transaction tests to identify the actual fault. This is often time consuming and the log itself may be cryptic and difficult to understand.

To address one or more of these issues, aspects of the present disclosure provide a system and method for capturing videos of synthetic tests in real time while the tests are running. The videos are then stored along with the test logs. Because the video captures exactly what happens in the user interface of the application during the test, an administrator can review the video of a failed test to determine whether the fault originated in the application server, in the application client, or in the test itself. Further still, the videos of the tests allow an administrator to accurately and quickly identify the exact moment when the test failed. This is turn allows for quicker turnarounds on fault correction and reduced application downtime.

2. Example System Implementation

Figure 1:
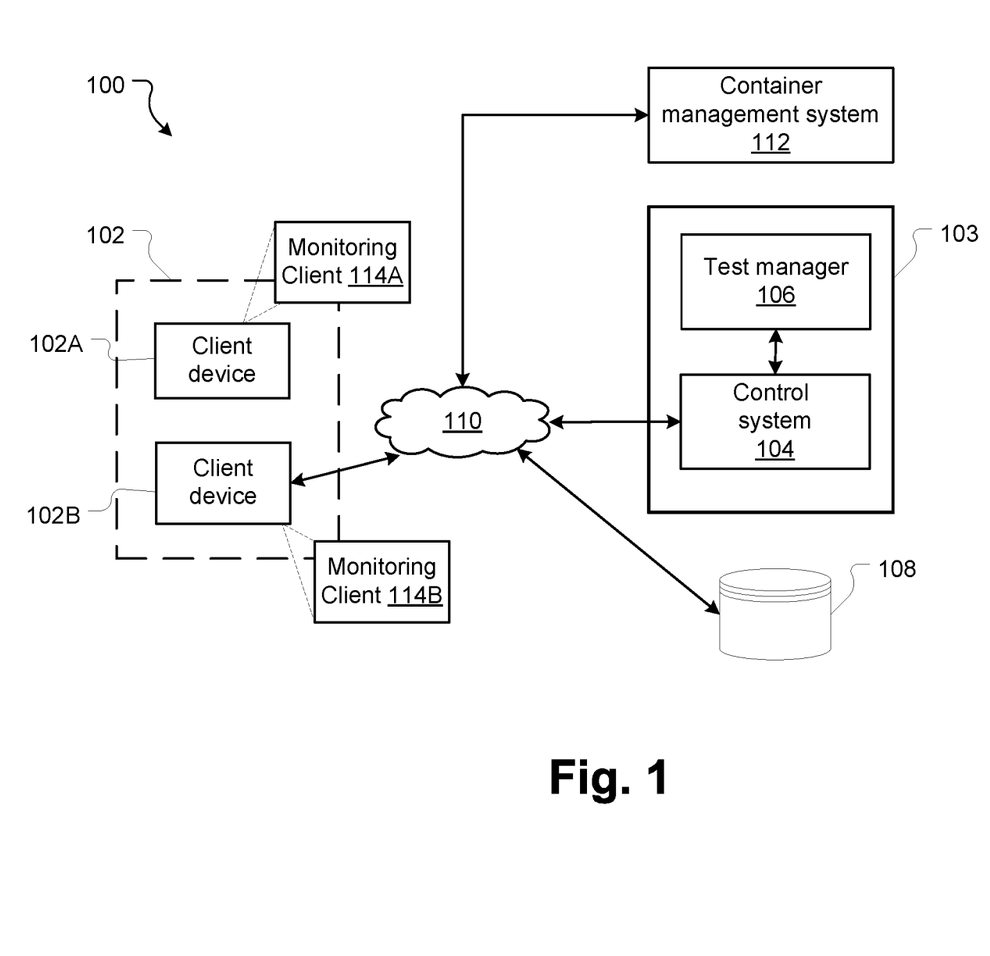
FIG. 1 illustrates a network environment in accordance with an embodiment of the invention.

FIG. 1 illustrates an environment 100 in which aspects of the present disclosure are implemented. The environment 100 includes one or more client devices 102, a monitoring system 103, a test database 108 and a container management system 112. The client devices 102, monitoring system 103, container management system 112, and the test database 108 communicate with each other over one or more communication networks 110.

The monitoring system 103 is configured to monitor performance of server applications. To do this, the monitoring system 103 includes a control system 104 and a test manager 106. The control system 104 is configured to manage synthetic tests. This typically involves receiving requests for testing server applications from client devices 102, scheduling tests based on the received requests, instructing the test manager 106 to perform the tests, receiving test results from the test manager 106 and storing this in the test database 108.

The test manager 106 is configured to run synthetic tests and to accomplish this, the test manager 106 utilizes one or more computing resources. In some embodiments, the test manager 106 communicates with the container management system (such as Amazon Web Services EC2 Container Services, Google Kubernetes, etc.) 112 to provision one or more computing resources to deploy the tests. Alternatively, the test manager 106 utilizes dedicated on-premises computing resources (not shown) operatively connected to the test manager 106.

A container management system 112 may be utilized when the test manager 106 services a large number of clients or has to deploy a large number of tests simultaneously. Physical on-premises devices may be utilized for lower volumes—i.e., when the test manager 106 services a small number of clients or runs a small number of tests.

In this disclosure, the test manager 106 is described in association with the container management system 112. However, it will be appreciated that the various features and techniques described herein could, with appropriate modifications, be used with physical on-premises devices without departing from the scope of the present disclosure.

Generally speaking, the test manager 106 utilizes containers for executing synthetic tests. The general process followed by the tests executing system 106 to do this includes receiving instructions to deploy a test and initializing one or more containers in which the test may be deployed. Once the test is executed in the container, the test manager 106 is also configured to retrieve test logs and associated video files from the initialized containers, provide the test logs and video files to the control system 104, and release the containers once the test is complete.

The client devices 102 are configured to generate test requests and display test results to users. To perform these functions, the client devices are configured to communicate with the monitoring system 103, e.g., to submit test requests and retrieve test results, and with the test database 108, e.g., to retrieve test video files. In certain embodiments, the client devices 102 include a monitoring client 114 to manage the synthetic tests.

The monitoring client 114 may be configured to allow the client device 102 to communicate with the monitoring system 103 and the test database 108. For example, it may allow a user of the client device to create a test request, forward the test request to the control system 104, periodically receive test results from the test database 108 and display the retrieved test results.

In another embodiment, instead of a dedicated monitoring client 114, the client device 102 simply includes a web browser and communicates with the control system 104 and the test database 108 via the web browser.

Only two client devices 102A and 102B have been illustrated, but normal operation of the control system 104 typically involves many more client devices connected to the control system 104 to request synthetic tests and retrieve test results.

The client devices 102 may communicate with the other systems in environment 100 via suitable communication networks. For example, the client devices 102 may communicate with the monitoring system 103 via private or public networks and with the database 108 system via public networks. It will be appreciated that based on the required implementation, any suitable communication network may be utilized to allow communication between the systems in environment 100.

The test database 108 stores test related data including test requests, e.g., the test requests submitted by one or more users of the client devices 102, task descriptors, e.g., the tasks scheduled by the monitoring system 103, and test results, e.g., test logs, and test metadata such as execution times, start times, end times, duration of tests, etc. In some embodiments, this data may be transmitted to the test database 108 by the control system 104.

The test database 108 is also configured to store video files corresponding to executed tests. In some embodiments the video files are stored along with the test results in the same database. In other embodiments, the test results may be stored in one database whereas the video files may be stored in a separate database. In this case, a link to the video file may be provided along with the test results so that monitoring client 114 can easily retrieve the corresponding video file when the test results are forwarded to the monitoring client 114.

In some cases, the test database 108 may be hosted on a private server, for example, on the same platform as the monitoring system 103. However, in majority of cases, the test database 108 is hosted on public infrastructure such as a cloud storage platform. For example, the test results may be stored in the form of tables in a cloud database such as Amazon DynamoDB®, whereas the video files may be hosted on a cloud storage service such as Amazon S3®.

In addition to storing test related data, the database 108 is configured to service data requests from the monitoring system 103 and the client devices 102. For example, it may be configured to receive test result requests from client devices 102 and communicate the corresponding test results to the client devices 102. Similarly, it may be configured to receive requests for test data from the control system 104 and service these requests accordingly.

In FIG. 1 the control system 104, the test manager 106 and the database 108 have been depicted as separate systems communicating over one or more networks 110. These systems, or their functionality, may, however, be divided over any number of physical systems communicating in any appropriate manner. By way of example, the three systems could be hosted by a single physical computer system.

3. Monitoring Process

Figure 2:
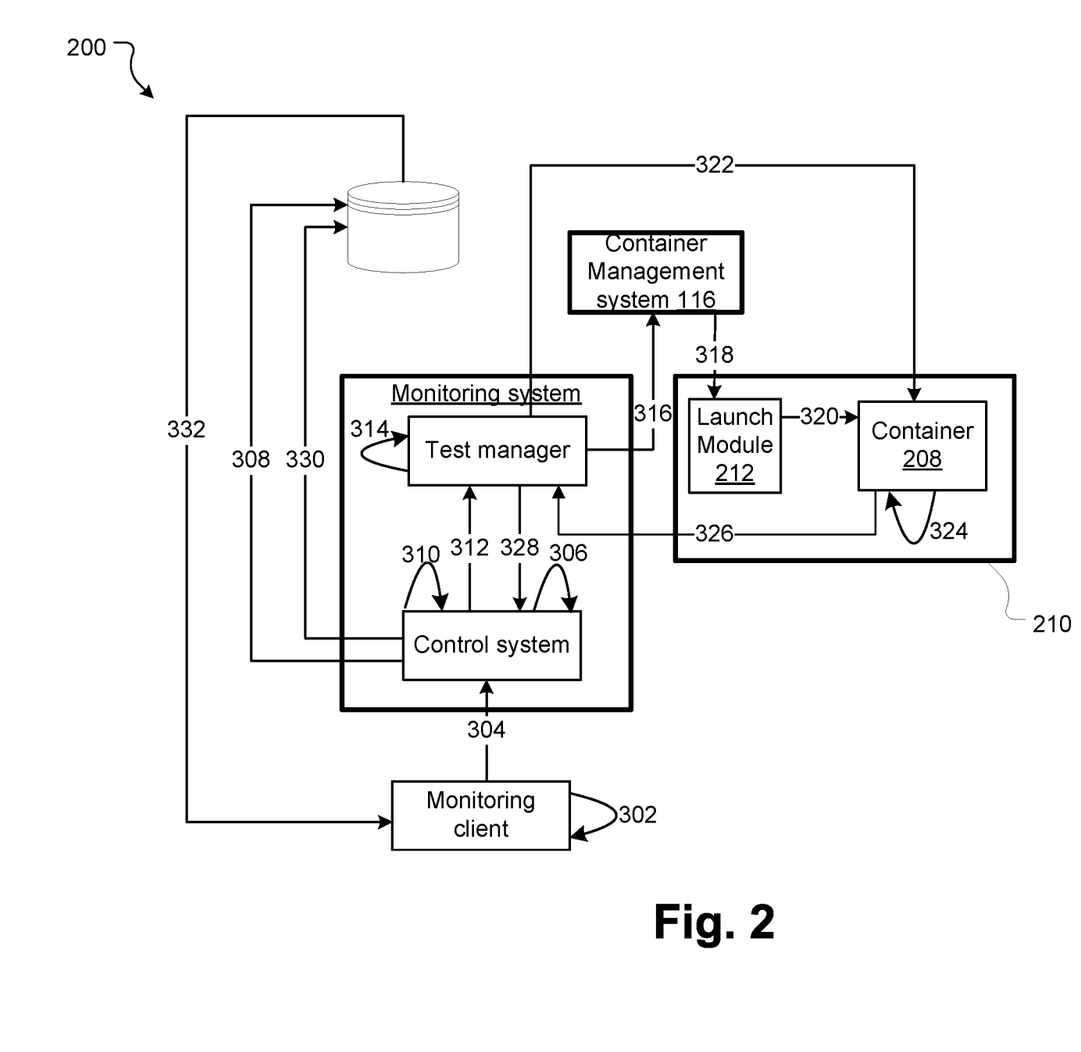
FIG. 2 illustrates the manner in which a CI management system operates to control a given build in accordance with an embodiment of the invention.

FIG. 2 is a block diagram 200 illustrating the manner in which a synthetic test is performed. In particular, this diagram illustrates an exemplary end-to-end process for managing synthetic tests. Although the process is described with reference to a single synthetic test, it will be appreciated that in real implementation, the system 100 is configured to manage multiple such synthetic tests for multiple end users/remote applications. Further, although the process is described as a continuous process, it can be segmented into smaller processes that run at different times/stages. For example, the creation and submission of a test request may be carried out at one stage, test execution may be carried out at another stage, and the presentation of test results may be carried out at a different time lapsed stage.

For clarity, in FIG. 2 functional modules and containers are represented by reference numerals beginning with the number 2, whereas the method steps are represented by reference numerals beginning with the number 3.

Generally speaking, administrators may setup synthetic tests to perform any type of monitoring function on their server applications. Examples of synthetic tests can include a simple ping to a particular URL, an application login test, or execution of specific transactions on a particular application. The method begins at step 302, where a synthetic test request is created. The test request may be created at the client device 102 and in particular using the monitoring client 114 executing on the client device.

The test request includes information about the synthetic test to be executed and may include for example, an identifier for the test, e.g., a name, a unique identifier, etc., a start time for executing the test, a frequency of how often the test should be executed, e.g., every 10 minutes, every 15 minutes, every hour, every day, etc., any stopping conditions for the test, e.g., maximum timeout value, and a test script.

In certain embodiments, a user may be able to create a new synthetic test request via the monitoring client 114. For example, the user may be able to select a "new test" option that allows the user to enter information about test. Further, the monitoring client 114 may allow the user to create a script for the test. For instance, it may provide an option to write the code for the test script or to automatically create the test script by recording steps of the test such as loading a page, clicking a link, or selecting an object in the client application. In some examples, this may be done by a script recording tool, such as the Selenium IDE add-on offered by the web browser automation tool, Selenium. With a script recording tool, actions performed on the client application, e.g. the web browser or dedicated client, are automatically converted into commands of a test script.

Once test information is received, the monitoring client 114 creates the test request. An example test request is illustrated in Table A below. Although a table has been used to illustrate information stored in the test request, the relevant information need not be stored in a table and could be stored in any appropriate format, e.g. a simple text file, a JSON file, an XML file.

TABLE A

| | Example test request |
|---|---|
| Synthetic test ID | [OBS] Splunk Login |
| Test start time | 26 February 2018 12:00:00 |
| Frequency | 10 minute intervals |
| Test conditions | Timeout after 1 minute |
| Test script | require('./helpers/selenium' );<br>const { By, until } = $webdriver;<br>const SCRIPT_TIMEOUT = 10000;<br>const PAGE_LOAD_TIMEOUT = 20000;<br>const LOGIN_WAIT_DELAY = 15000;<br>const { LOGIN_URL } = $check.args;<br>const printContent = function (title, body) {<br>console.log('\n${title}\n==========================\n');<br>console.log(body);<br>console.log('\n==========================\n');<br>return true;<br>};<br>const printPageBodyContent = function ( ) {<br>return $driver.findElement(By.tagName('body')).getAttribute('innerHTML').then(function(body) {<br>    printContent('Login page body content', body);<br>})<br>const printLogs = ( ) => Promise.all([<br>$driver.manage( ).logs( ).get($webdriver.logging.Type.BROWSER).then(function(entries) {<br>    printContent('Console logs', entries);<br>}),<br>$driver.manage( ).logs( ).get($webdriver.logging.Type.DRIVER).then(function(entries) {<br>    printContent('Driver logs', entries);<br>}),<br>]);<br>const fail = (reason) => {<br>printLogs( ).then(( ) => {<br>    $checkfail(reason);<br>});<br>};<br>const timeouts = $driver.manage( ).timeouts( ); |

TABLE A-continued

Example test request

```
timeouts.setScriptTimeout(SCRIPT_TIMEOUT);
timeouts.pageLoadTimeout(PAGE_LOAD_TIMEOUT);
$driver.get(LOGIN_URL).the(( ) => {
$check.time('Loaded Login page');
}, ( ) => {
fail('Unable to open ${LOGIN_URL} in ${PAGE_LOAD_TIMEOUT}ms.');
});
$driver.wait(until.titleIs('Login | Splunk'), LOGIN_WAIT_DELAY).catch((err) => {
return printPageBodyContent( ).then(( ) => {
    fail('Page title did not match: ${err}');
});
});
$driver.findElement(By.id('username')).sendKeys($check.args.OE_TESTUSER_BOT_USER);
$driver.findElement(By.id('password')).sendKeys($check.secrets.OE_TESTUSER_BOT_PASS);
$driver.findElement(By.css('input[type=submit]')).click( ).then(( ) => {
$check-time('Logging in user...');
});
$driver.wait(until.titleMatches(/^Search\|Splunk/), LOGIN_WAIT_DELAY).then(res) => {
$check.pass('Login success');
}, (err) => {
fail('Login failed: ${err}');
```

This example test request is created for monitoring the login performance for a particular application (splunk) available via a web server. Accordingly, the test script provided in the request includes the URL for the landing/login page of the web application, a test username and a test password for attempting to login. The test script also includes code for outputting that the test is successful if the test is completed within a particular period of time, for recording times when certain steps are performed in the test, e.g., test starting time, time when the login page loads, time when the website attempts to log in the user, and the time when login is successful. In addition to this, the test script includes code for outputting that the test has failed if the website times out at any of the test steps, i.e., loading webpage, logging in the user, or displaying user account webpage after logging in, and for outputting at which stage the test failed. When the script is eventually executed, a test log is created from these outputs.

At step 304, the monitoring client 114 forwards the test request to the monitoring system 103 and in particular to the control system 104. Upon receiving the test request, the control system 104 may be configured to create a monitoring task descriptor for the test based on the received test request. This is done at step 306. The monitoring task descriptor may include information for uniquely identifying the task, e.g., a unique task ID, identifying the requesting party, e.g., requesting party ID, identifying the test, e.g., unique test ID received in the test request, the test start time, test frequency, if the test is meant to be a recurring test, and the test script.

When test information is provided in the test request, the control system 104 utilizes this to create the monitoring task descriptor. Alternatively, if one or more parameters required to schedule the test are not provided in the test request, the control system 104 may be configured to set default values for these parameters. An example task descriptor is illustrated in Table B below.

TABLE B

| Example monitoring task descriptor | |
|---|---|
| Task ID | 557129232d61 |
| Requestor ID | 789437850bdjsfb |
| Synthetic test ID | [OBS] Splunk Login |

TABLE B-continued

| Example monitoring task descriptor | |
|---|---|
| Test start time | 26 February 2018 12:00:00 |
| Frequency | 10 minute intervals |
| Test conditions | Timeout after 1 minute |
| Test script | See example in table A above |

Once the monitoring task descriptor is created, it may be saved in the test database 108 at step 308. The control system 104 then checks whether the synthetic test should be executed, at step 310. In one embodiment, this may be done by comparing the start time of the test in the corresponding task description with the current time. If the current time is not equal to the start time of the test, the method returns to step 310. Alternatively, if the current time is equal to the start time of the test, the method proceeds to step 312 where the control system 104 instructs the test manager 106 to run the corresponding synthetic test.

In certain embodiments, the control system 104 may forward the task descriptor ID of the corresponding monitoring task to the test manager 106 along with instructions to execute the corresponding synthetic test. Alternatively, the control system 104 retrieves the task descriptor from the test database 108 and forwards it along with the test execution instructions to the test manager 106. At this stage, the control system 104 may also update the start time of the test in the task descriptor based on the frequency of the test. For example, if the frequency of the test is 10 minutes, the control system 104 may be configured to update the start time in the task descriptor to 10 minutes later.

As described previously, the role of the test manager 106 is to execute tests and provide test results and corresponding video files back to the control system 104. When a container management system 112 is utilized to execute the synthetic tests, the test manager 106 may initially interact with the container management system 112 to create a container group 210 for executing one or more synthetic tests. In AWS EC2 Container Services, this container group is called a Task, whereas in Google Kubernetes it is referred to as a pod. Subsequently, when the test manager 106 wishes to initiate a test, for example in response to receiving instructions to execute a synthetic test, it may do so within the container group 210.

In certain embodiments, the container group 210 may be on a hardware instance, which also includes a launch module 212, i.e., a program or set of instructions. The launch module 212 when executed retrieves container images and launches containers from the retrieved container images in the container group 210. It will be appreciated that although the launch module 212 is shown as part of the container group 210 in FIG. 2, it is not logically a part of the container group 210, but on the same hardware instance as the container group 210.

Next, at step 314, to initialize a container within the container group, the test manager 310 creates a task definition. The task definition is usually required to run container(s) in a container management system, such as AWS EC2 Container Service. The task definition typically specifies the container image(s) to be used for the task, the CPU and memory required for the container, whether any port mappings, that allow the container to have external connectivity, are required, memory that can be accessed by other containers, and environment variables that can be passed to the container for its use. Furthermore, the task definition may include information for mounting one or more non-ephemeral memory volumes for storing data or software that may be used by the container being initiated.

For initiating a container to run the synthetic test, the test manager 106 may generate a task definition that includes:
- name and/or identifier of the container image to be retrieved and used for the test (in the present disclosure, if the test is for an application hosted by a web server, a container image having a web browser is selected and if the test is for an application hosted by an application server that is not a web server, a container image having the corresponding application client may be selected),
- location of the container image,
- the CPU and memory required for the container,
- the networking mode, such as a 'bridge' networking mode or a 'host' networking mode that allows the container to have external connectivity,
- volume information for retrieving and storing data or software that is used by the container to perform its functions,
- a memory identifier identifying a memory mount that can be shared between multiple containers, and
- environment variables that are passed to the controller container once it is launched.

Without being exhaustive, environment variables may include variables defined by the test manager 106, such as, for example, information about the settings governing operation of the test, e.g., test timeout parameters, IP address and port on which the container is to send test result data back to the test manager 106, and/or settings for modifying behavior of scripts that are not specific to a particular test, e.g., the test bootstrap code that configures logging and metrics endpoints for use by test scripts.

In addition to creating the task definition, in some embodiments, the test manager 106 also maintains a record of the task definitions and the corresponding task identifier being executed in a data structure at this step. Once the monitoring task is completed, i.e., the test is complete, the test manager 106 may remove the task definition and the corresponding task identifier from the data structure. This data structure (not shown) may be maintained to keep a record of the monitoring tasks that were executed and may be queried at a later stage if required.

At step 316, the test manager 106 passes the created task definition to the container management system 112 over communication network 110.

At step 318, the container management system 112 provides the task definitions to the launch module 212 and instructs it to retrieve the container corresponding to the container image specified in the task definition.

The launch module 212 inspects the location of the container image and retrieves the container image from that location. It will be appreciated that the container image may be retrieved from an external source such as an externally hosted repository of container images, e.g., Docker hub, or it may be retrieved from a local cache. In certain embodiments, the container image may be retrieved from an external source in a first instance and then stored locally for future use. At 320, the launch module 212 causes the container image to be executed based on the parameters in the task definition to start a test container 208.

In certain embodiments, a memory 209, based on the memory parameters defined in the task definition, is also mounted in the container group 210 at this stage. This memory may be utilized to store the test script and test results and video files, for example. In other embodiments, each container may be allocated a discrete unit of storage space for storing data.

Next, at step 322 the test manager forwards the test script to the container. In certain embodiments, the container communicates the task ID received in the environment variables to the test manager 106, which writes the test script into the container memory.

At step 324, the container executes the test script and writes the test output in a test log file. While the synthetic test is being executed on the client, i.e., the web browser or the dedicated client, the container also records the state of the client user interface in real time and stores this in a video file. The video file is passed to the test manager 106 along with the test log file at step 326.

At step 326, test manager 106 receives the test log and video file from the container 208 and passes these to the control system 104 at step 328. To receive the video file, the test manager 106 may set up a 'listener', e.g., a TCP socket, for each specific test run. In certain embodiments, when the container is launched, the CMS creates a container ID and forwards this to the test manager 106. This ID may be used for retrieving the test log from the container and writing the test script into the container.

The control system 104 in turn stores the test output and the video file in the database 108 at step 330. In addition to generating the task descriptor for scheduling monitoring tests, the control system 104 utilizes the task descriptor to provide test updates to the monitoring clients. Specifically, the control module provides the task descriptor as a placeholder to the monitoring client. Users may poll this placeholder from time to time to check the status of tests.

Finally, at step 332, the test results, i.e., the test logs, test metadata, and/or video file, are forwarded from the test database 108 to the monitoring client 114.

In the embodiment described with reference to FIG. 2, it is assumed that the test script and program for executing the test script are not available at the container when it is first launched. Instead, the container 208 retrieves these. In other embodiments, the test script and program may be forwarded to the container before it is launched, e.g., by passing these as environment variables.

4. Testing Process

Figure 3:
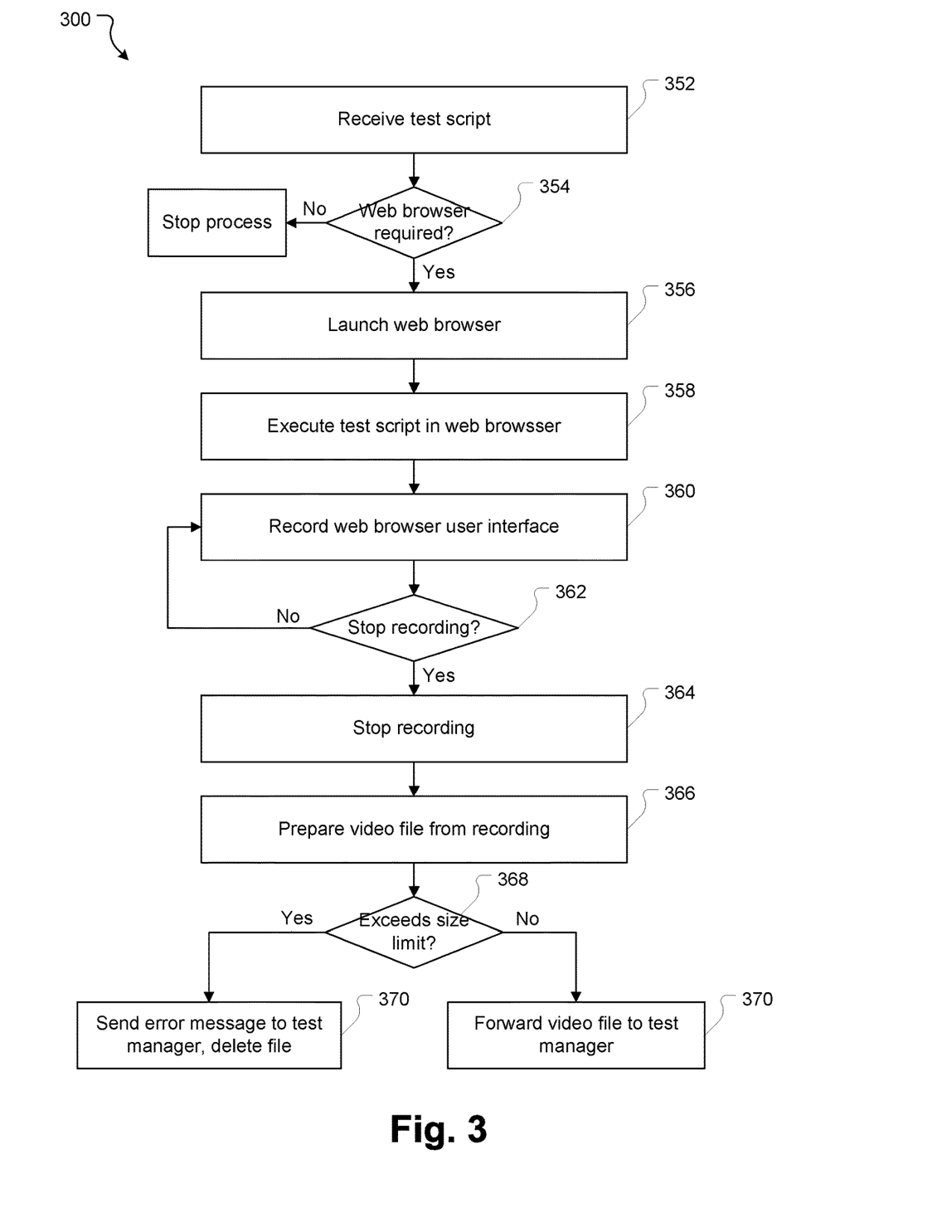
FIG. 3 illustrates a data processing algorithm or method for executing a synthetic test in accordance with an embodiment of the invention.

FIG. 3 is a flowchart illustrating a method 350 for executing a synthetic test in a container. In particular, method 350 describes in detail the steps that are performed in the container 208 at steps 322-326 of FIG. 2. The present method is described with reference to a synthetic test performed for an application hosted on a web server. Accordingly, the test script is executed in a web browser in this case. However, it will be understood that the method can function just as easily when performing a synthetic test for an application hosted on an application server that is not a web server. In that case, the test script will be executed in the dedicated client for that application.

Figure 4:
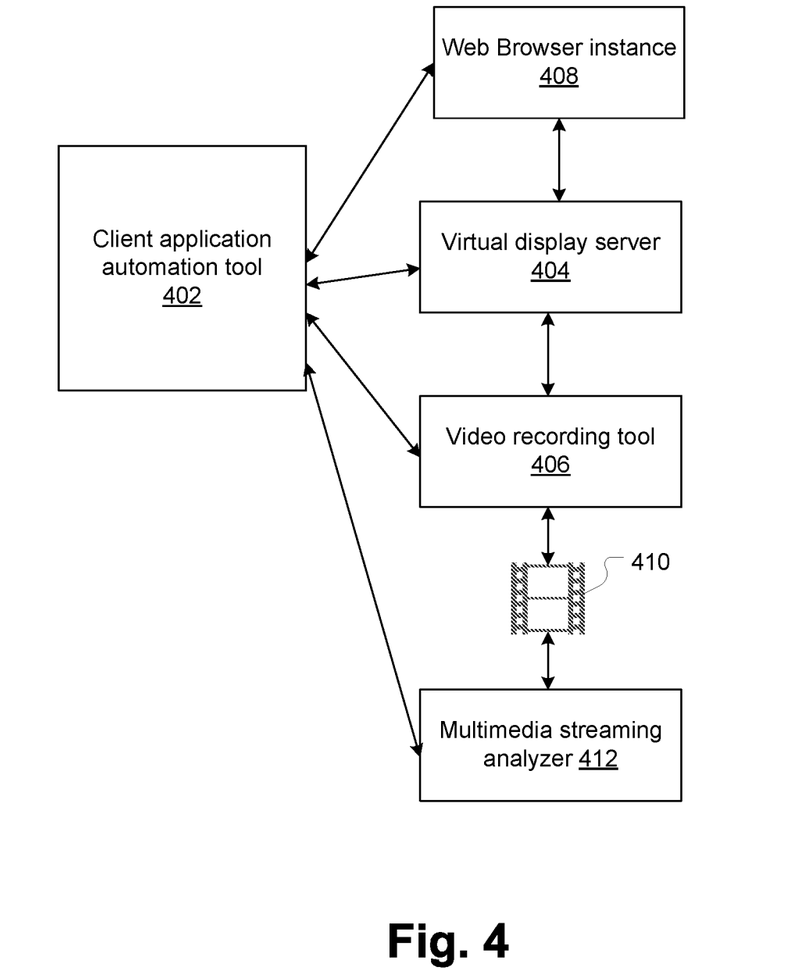
FIG. 4 illustrates system elements used for executing the synthetic test of FIG. 3 in accordance with an embodiment of the invention.

FIG. 4 illustrates the various system elements that may be utilized within the container for performing method 350. The system elements include a client application automation tool 402, a virtual display server 404, and a video recording tool 406. Any known client application automation tool, virtual display server and video recording tool may be employed, but in a preferred embodiment, the client application automation tool 402 is Selenium, the virtual display server 404 is an X virtual frame buffer (xvfb) and the video recording tool 406 is ffmpeg.

The client application automation tool 402 is configured to start a client application instance, e.g. a web browser instance 408 in method 350, and control that instance. In particular, it is configured to send commands to the web browser instance to perform the steps of the test script. This may be implemented through a browser specific driver which launches a web browser application, such as Firefox, Chrome, or Internet Explorer, and sends commands to the browser application. The browser-specific driver also retrieves results from the browser instance 408 and feeds them back to the client application automation tool 402.

In addition to launching the browser application, the client application automation tool 402 is configured to initialize and launch the virtual display server 404 and the video recording tool 406. The virtual display server 404 is configured to perform graphical operations associated with the launched web browser instance 408 in virtual memory without showing any screen output—i.e., it is configured to receive inputs from the browser instance 408 and perform graphical operations on this input to render a display, without actually rendering it. The video recording tool 406 is configured to connect to the virtual display server 404 to receive inputs and generate a video file corresponding to the received inputs. Further operation of these system elements will be described in conjunction with method 350.

Returning to FIG. 3, the method 350 begins at step 352, where the test script for the test to the executed is received. In certain embodiments, the test script may be written into the container by the test manager 106. Alternatively, the test script may be made available via a mounted volume or pushed to the container via the environment variables. Further still, in some embodiment, the container may be configured to retrieve the test script from the test database 108.

Next, at step 354, a determination is made whether the test is to be conducted in a web browser or not. Any technique for making this determination may be employed. In certain embodiments, the task descriptor may include a flag indicating whether the test requires a web browser or not. For example, a flag with the value '1' may indicate that the synthetic test is to be run within a web browser whereas a value of '0' may indicate that the synthetic test does not have to run within a web browser. Alternatively, the determination may be made by conducting a lookup in the test script for keywords such as "Web driver', "Chrome", Selenium", etc.

In a preferred embodiment, the client application automation tool 402 may be configured to make a determination whether a web browser is required to run the test script or not before launching the web browser instance 408. This may be done, in one example, by adding a wrapper script to the web browser automation tool 402.

If the test does not require a web browser, the method 350 ends. Alternatively, if it is determined that the test is to be conducted in a web browser, the method proceeds to step 356, where the web browser automation tool 402 is configured to launch a web browser instance 408. In the selenium example, this may be done by invoking the command $driver.get(LOGIN_URL), which would cause Selenium to start a browser instance 408 and load the page defined in the LOGIN_URL variable.

At step 358, the test script is executed on the web browser instance 408. While the test script is running, a test log may be created as the test steps through the code lines of the test script and provided to the client application automation tool 402. In some cases, the test log may record the time the test started, the time the test completed each stage of the test, and if each test stage was successful or not. In other cases, the test log may simply indicate whether the test was successful or not.

Figure 5:
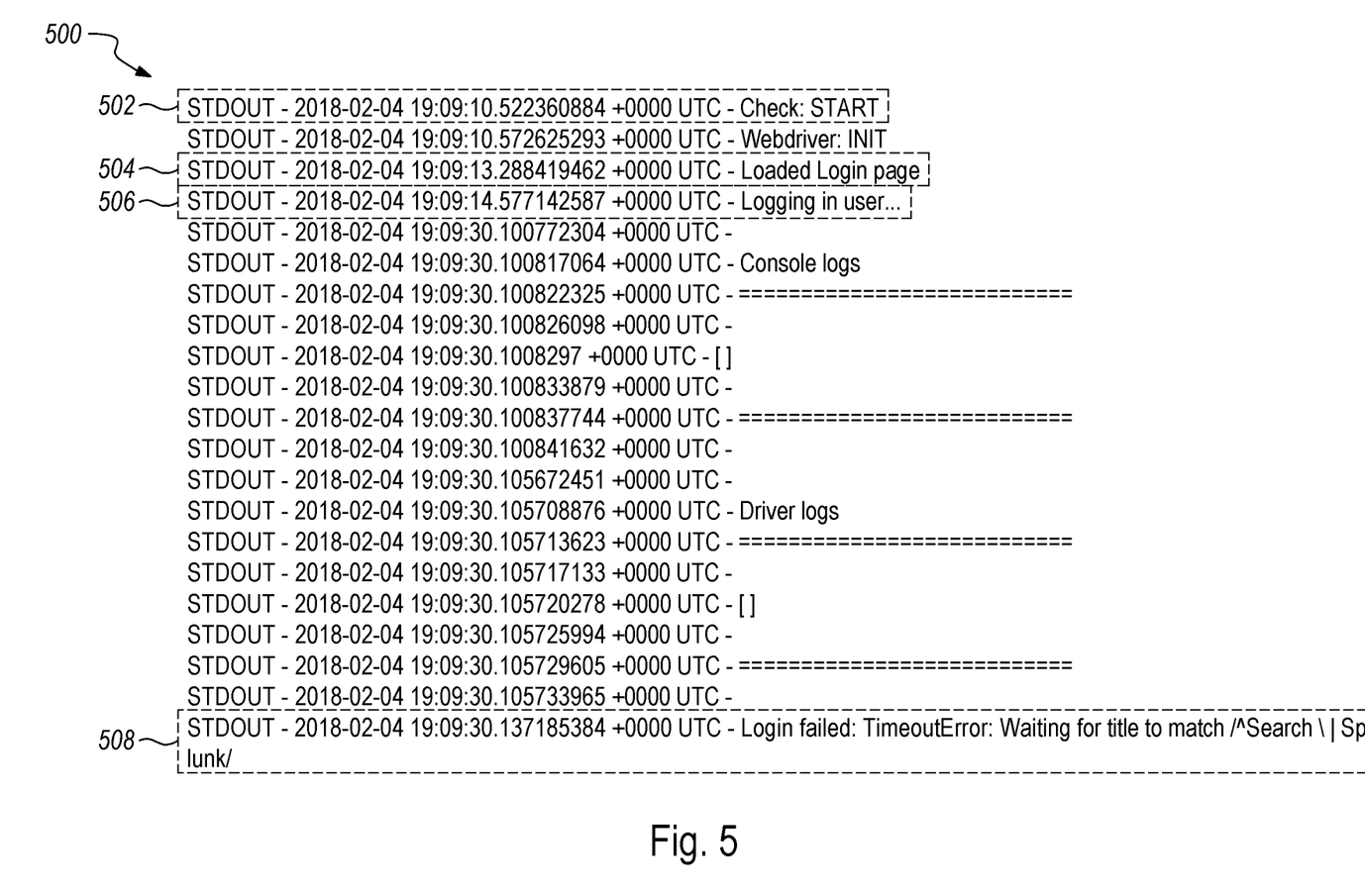
FIG. 5 illustrates an example test log in accordance with an embodiment of the invention.

An example test log 500 is depicted in FIG. 5. As seen in this figure, the test log records the time the check started 502, the time at which the login page was loaded 504, the time at which the web page starting logging in the user 506 and the time at which the login failed 508. In this particular example, login had failed because the user account page had not loaded in time.

Returning to FIG. 3, at step 360, the container 208 starts recording a video of the user interface of the web browser application—that is it captures the state of the user interface in real time such that behavior of the web browser can be continuously captured while the test script is executing on the web browser application.

In certain embodiments, the client application automation tool 402 initializes the virtual display server 404 and connects it to the web browser instance 408. The virtual display server 404 receives inputs from the web browser as the test is being executed and performs graphical operations on this input without actually displaying a screen output. The client application automation tool 402 also initializes and connects the video recording tool 406 to the virtual display server 404 at this step to receive and record a video stream.

It will be appreciated that although steps 358 and 360 are described sequentially, these steps are executed simultaneously, that is, the container begins capturing a video of the web browser user interface as soon as the test script is run on the web browser application.

Next, at step 362, a determination is made whether to stop recording. Generally speaking, the video recording is stopped either when the test script has finished executing or when the test has timed out for some reason. Accordingly, at this step a determination is made whether the test script has finished executing, e.g., when the client application automation tool 402 detects that the test script has exited, or if the operation has timed out, e.g., if the time since the test started has exceeded a predetermined time limit. If any one of these conditions is met, the video recording tool 406 is configured to stop recording at step 364. Alternatively, if neither of these conditions is met, the video recording tool 406 continues recording the web browser user interface. It will be appreciated that the test script may time out if for example the web browser instance 408 itself stops functioning or if a particular stage of the test does not respond within a predetermined time frame.

Once the video has stopped recording at step 364, the video recording tool 406 creates a video file 410 from the recording at step 366.

In certain embodiments, the container may also be configured to determine whether the video is corrupted. To do this, in one example, a multimedia stream analyzer (analyzer 412 in FIG. 4) such as ffprobe may be utilized. Once the video file is created, the client application automation tool 402 initializes the multimedia stream analyzer 412 and provides the name of the created video file 410 to it. The multimedia stream analyzer 412 in turn analyzes the video. The output of the analysis may be utilized to determine whether the video is corrupted. For example, if the output is a binary 0, it is determined that the file is not corrupted. Alternatively, if the output is a non-zero value, a determination is made the file is corrupted.

Alternatively or in addition, the container may also be configured to compress the video file, if it is not corrupted, for example, to reduce the size of the video file at this step. Any known video compression techniques may be utilized to do this.

Next, at step 368, a determination is made whether the size of the video file exceeds a predetermined size, e.g., 10 MB. If the file size exceeds the predetermined size limit, the video file may be deleted and an error message may be communicated to the test manager 106 indicating that the video file was deleted because it was too large at step 370. Alternatively, if the file size does not exceed the size limit, the method proceeds to step 372 where the video file is forwarded to the test manager 106 along with the test log created while executing the test scripts.

In method 350, a video file is recorded for a synthetic test irrespective of whether the test is successful or has failed. In other embodiments, the monitoring system 103 may be configured to only record video files for tests that have failed and delete video files for successful tests. Typically, when a test script exits after successfully executing, a "0" is returned and if the test script for some reason does not execute successfully, a "1" is returned. In some embodiments, this binary output value may be inspected and if the output is "0", the video file may be deleted.

As described previously, once the synthetic test is completed, the test results and corresponding video file may be stored in the test database 108. Whenever the monitoring client is activated on the client device, the test monitoring client may send a request to the test database to forward test results for one or more tests requested by the client device in a particular time frame. For example, the monitoring client 114 may send a request to the test database 108 to provide test results for a particular test ID in the last one week.

Figure 6:
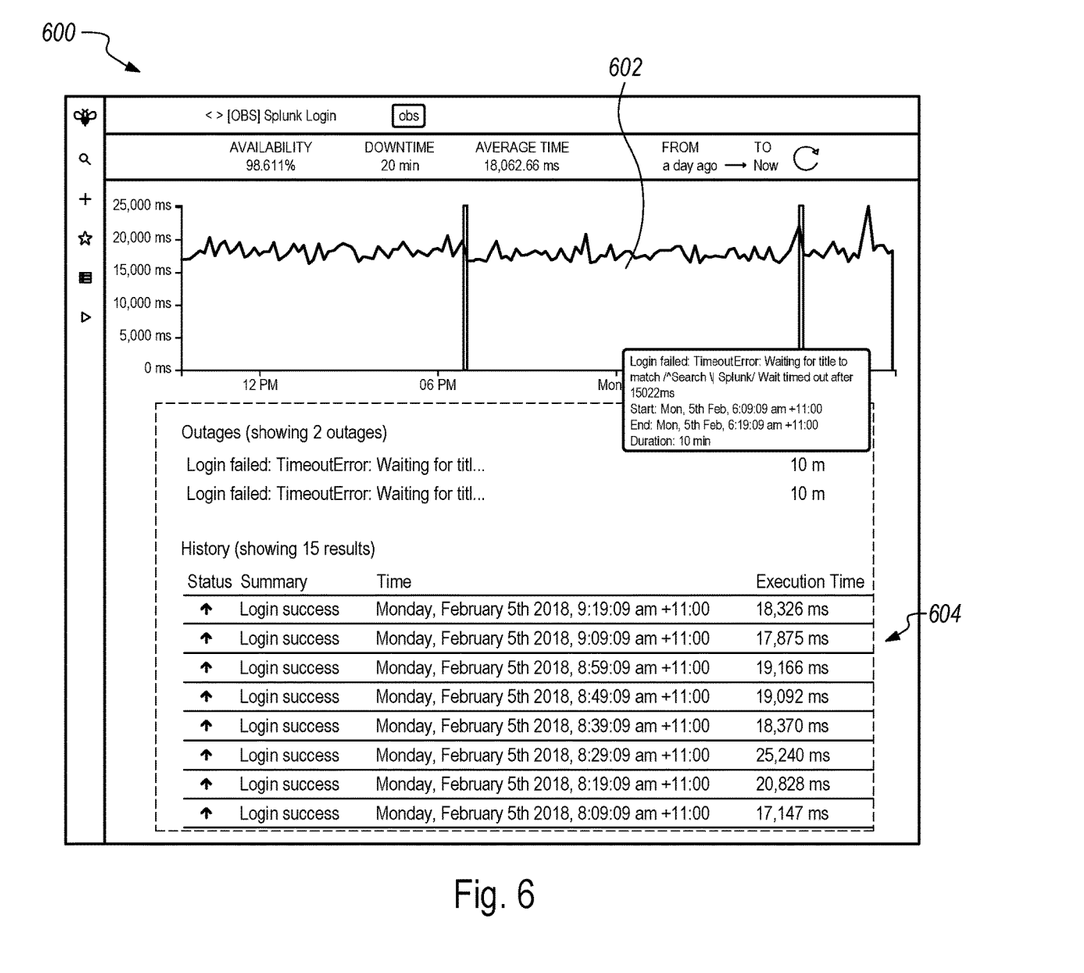
FIG. 6 illustrates an example user interface for displaying test results in accordance with an embodiment of the invention.

In response to this request, the test database 108 may identify the task ID corresponding to the test ID provided by the client monitoring application and retrieve results of all the tests conducted for that particular task ID in the last week. The client monitoring application may then display these results on the client device. FIG. 6 illustrates an example user interface of the client monitoring application depicting test results for a particular test. As seen in the figure, the client monitoring application may be configured to create a visual 602 based on key test data such as success or failure and test completion time. It is also configured to display a list of the results of the tests conducted in that time frame 604. A user may be allowed to drill down into any of the results in the list 604 to obtain more information about the test, such as the test logs and the video associated with the test.

Figure 7:
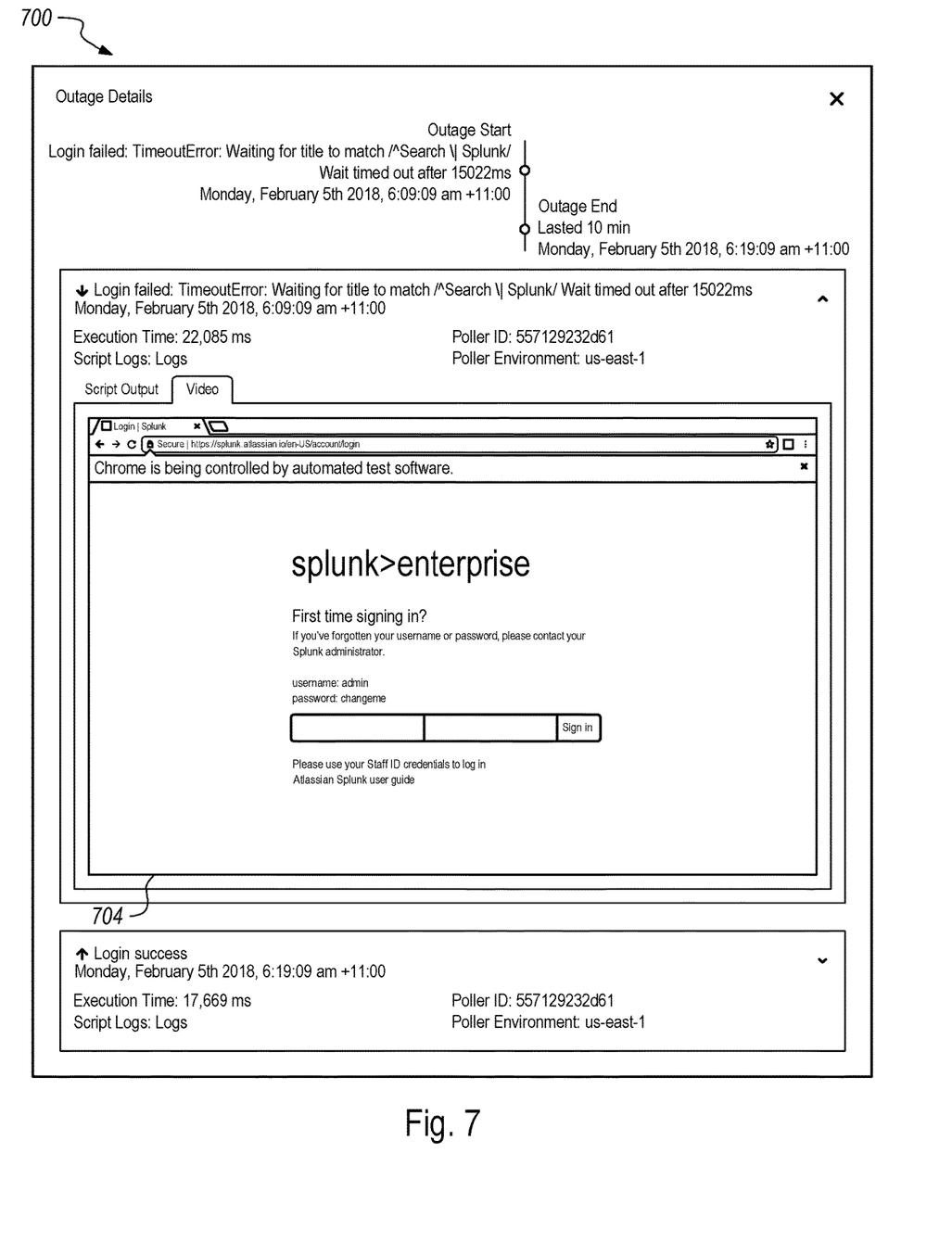
FIG. 7 illustrates an example user interface for a particular test result in accordance with an embodiment of the invention.

FIG. 7 illustrates an example user interface when a particular test is selected from the user interface depicted in FIG. 6. As seen, the video 704 of that particular test is attached to the test results and can be viewed to check how the test progressed, whether the test is for a failure or a success and at what exact point during the test, the test failed.

5. Video Processing

In certain embodiments, the monitoring system 103 may be configured to process the test log and video data before storing it in the test database 108. For example, the monitoring system 103 may be configured to synchronize the test log and the video file such that each output line in the test log can be matched with the corresponding position in the video file. This can help, for example, to quickly identify at which stage of the script the test failed. Using this synchronization, a user may be able to select a particular line in the test log, which then automatically plays the corresponding portion of the video where the selected output was recorded.

This synchronization, in one embodiment, may be done based on the timing information provided in the test log and the video file. For a given test, the video file should ideally be about the same length as the duration between the recorded start times and end times of the test. Taking the example of the test log depicted in FIG. 4, where the test starts at 19:09:10.522360884 and ends at 19:09:30.137185384, the duration of the test can be calculated to be about 30 seconds. The video file for this test should ideally also be about the same duration. Accordingly, in this example, the monitoring system 103 may be configured to add markers in the video file at the 3 second mark when the login page is loaded, at the 4 second mark when the application starts logging in the user, and at the 30 second mark where the test failed. Then, if the user selects the output line corresponding to "logging in the user" in the test log, the corresponding location in the video may be selected based on the corresponding marker and the video file can be played from that point.

Similarly, it may be possible to synchronize the video file with the underlying test script to provide more accurate and precise indication of which line of code in a particular test script resulted in failure. One way of doing this is stepping through the underlying test script code line by line and recording the time that each line is executed. This provides precise execution timing for every instruction. Alternatively, execution of the code may be traced, where the code runs uninterrupted. However, periodically, e.g., every few microseconds, the system records which line of the code is currently executing.

In addition to allowing users to skip ahead in a video file to the portion where the test failed, the video markers may be utilized to crop video files thereby reducing the length of the videos and consequently the file size. For example, if a scripted test includes multiple transactions in an application interface and all the transactions have successfully executed, except one, the video file may be cropped to show just the portion of the recording for the transaction that did not execute.

In one example, this may be implemented by using a video editing tool to automatically crop a video to particular times identified by checkpoints recorded by the test script.

6. Hardware Overview

The operations/techniques described herein are implemented by one or more special-purpose computing systems or devices. For example, in environment 100: monitoring system 103 may be provided by one or more computer systems; the client devices 102 are computer systems; the container management system 112 is provided by one or more computer systems; the test database 108 is provided by one or more distributed computing systems, and the computing resources on the cloud computing platform are also provided by one or more computer systems.

A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further alternatively, a special-purpose computing system may include one or more general purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 8:
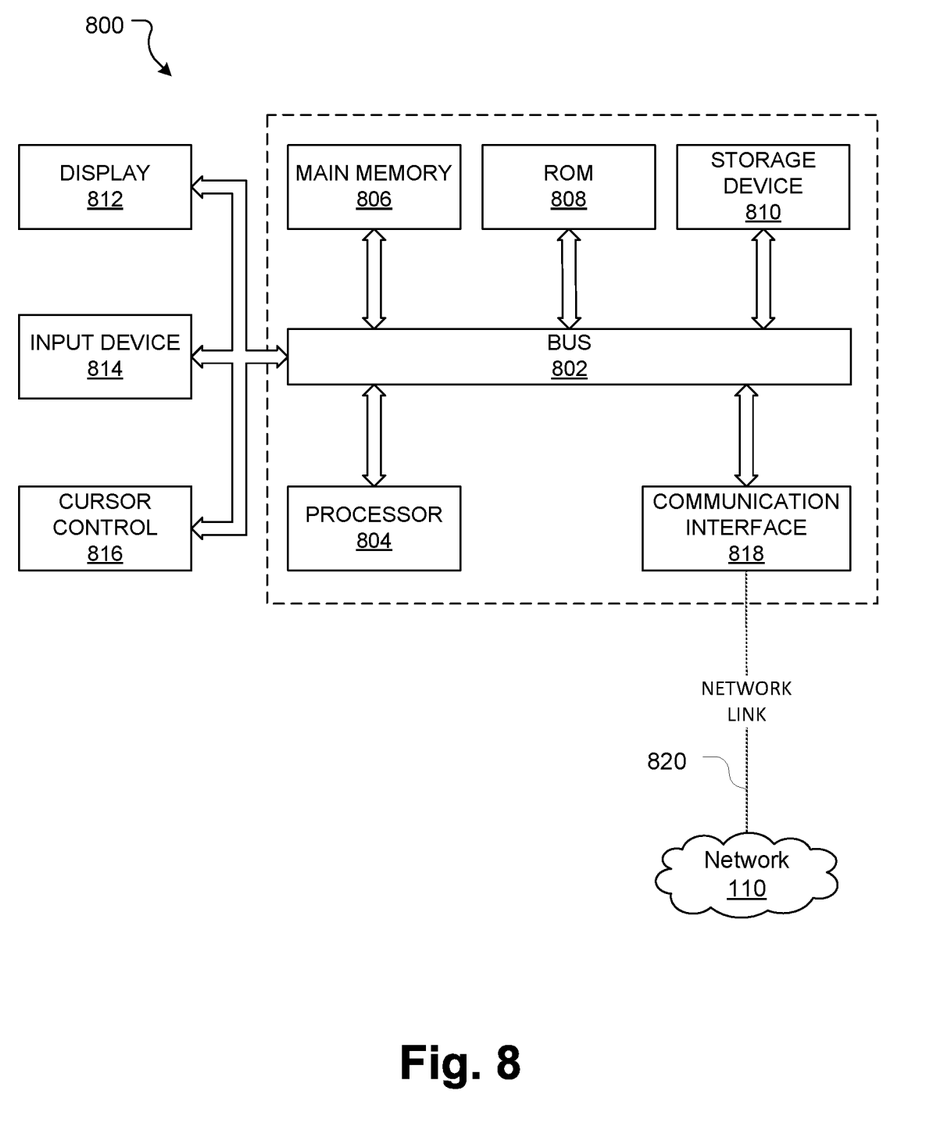
FIG. 8 shows a block diagram of a computer system with which an embodiment of the invention may be implemented.

By way of example, FIG. 8 provides a block diagram that illustrates one example of a computer system 800 upon which embodiments of the invention may be implemented. Computer system 800 includes a bus 802 or other communication mechanism for communicating information, and a hardware processor 804 coupled with bus 802 for processing information. Hardware processor 804 may be, for example, a general-purpose microprocessor, a graphical processing unit, or other processing unit.

Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 800, such as a magnetic disk or optical disk, is provided and coupled to bus 802 for storing information and instructions.

In case the computer system 800 is the client device 102, the computer system 800 may be coupled via bus 802 to a display 812 (such as an LCD, LED, touch screen display or other display), for displaying information (such as test results) to a computer user. An input device 814, including alphanumeric and other keys, may be coupled to the bus 802 for communicating information (such as test requests) and command selections to processor 804. Another type of user input device is cursor control 816, such as a mouse, a trackball, or cursor direction keys for communicating direction information and command selections to processor 304 and for controlling cursor movement on display 812.

According to one embodiment, the techniques herein are performed by computer system 800 in response to processor 804 executing one or more sequences of one or more instructions contained in main memory 806. Such instructions may be read into main memory 806 from another storage medium, such as a remote database. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Computer system 800 also includes a communication interface 818 coupled to bus 302. Communication interface 818 provides a two-way data communication coupling to a network link 820 that is connected to the communication network 110. For example, communication interface 818 may be an integrated services digital network (ISDN) card, cable modem, satellite modem, etc. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Computer system 800 can send messages and receive data, including program code, through the network(s) 110, network link 820 and communication interface 818. In case the computer system hosts the control system 104, the computer system 800 may receive a test script from a client device 102 via the network 110, network link 820, and communication interface 818. The received test script may be executed by processor 804 as it is received, and/or forwarded to the test database 108 via the communication interface 818, network link 820, and interwork 110 for later execution.

As described previously, the computer system 800 as described above may be configured in a plurality of useful arrangements. In one arrangement, the computer system 750 is a server computer (such as a computer system hosting the control system 104) comprising one or more non-transitory computer-readable data storage media stored with one or more sequences of instructions/software modules which when executed cause the computer to perform the operations/techniques that are described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using process steps. The functionality/processing of a given process step could potentially be performed in various different ways and by various different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extends to alternative combinations of two or more of the individual features mentioned or evident from the text or drawings. These different combinations constitute various alternative aspects of the embodiments.

What is claimed is:

1. A computer implemented method for monitoring an application hosted on a server, the method comprising:
   receiving a test request at a monitoring system, the test request comprising information about a synthetic test to be performed on an application and a test script for performing the test;
   scheduling a monitoring task based on the test request, the monitoring task comprising information about a test start time;
   in response to determining a scheduled monitoring task is ready for execution: automatically launching a client application within a container, retrieving the test script, and automatically executing the test script in the client application;
   while executing the test script, automatically recording in real time, a state of a user interface of the client application;
   initializing a virtual display server within the container to receive inputs from the client application and perform graphical operations on the inputs to generate display rendering information of the client application;
   initializing a video recording tool within the container to receive the display rendering information and generate a video file based on the received display rendering information; and
   upon ending of the monitoring task, transmitting the video file to a client device.

2. The computer implemented method of claim 1, further comprising analyzing the video file to determine whether the file is corrupted.

3. The computer implemented method of claim 1, further comprising generating a test log of the synthetic test comprising an indication of the performance of the synthetic test at one or more steps of the synthetic test.

4. The computer implemented method of claim 3, further comprising:
   synchronizing the video file of the recording with the test log; and
   inserting markers in the video file at locations in the recording corresponding to the one or more steps of the synthetic test indicated in the test log.

5. The computer implemented method of claim 4, further comprising:
   determining whether one or more steps of the synthetic test have failed; and
   upon determining that one or more steps of the synthetic test have failed, cropping the video file of the recording to retain portions of the recording corresponding to the one or more steps of the synthetic test that have failed.

6. The computer implemented method of claim 1, further comprising:
   synchronizing the video file of the recording with the test script; and
   inserting markers in the video file at locations in the recording corresponding to one or more lines of code of the test script.

7. The computer implemented method of claim 1, further comprising:
   determining whether a size of the video file exceeds a predetermined threshold size; and
   deleting the video file upon determining that the size of the file exceeds the predetermined threshold size.

8. The computer implemented method of claim 1, wherein the client application is a web browser.

9. A system for monitoring an application hosted on a server, the system comprising:
   a processor,
   a communication interface, and
   a non-transitory computer-readable storage medium storing sequences of instructions, which when executed by the processor, cause the processor to:
   receive a test request, the test request comprising information about a synthetic test to be performed on an application and a test script for performing the test;
   schedule a monitoring task based on the test request, the monitoring task comprising information about a test start time;
   in response to determining a scheduled monitoring task is ready for execution: automatically launch a client application within a container, retrieving the test script, and automatically executing the test script in the client application;
   while executing the test script, automatically record in real time, a state of a user interface of the client application;
   initialize a virtual display server within the container to receive inputs from the client application and perform graphical operations on the inputs to generate display rendering information of the client application;
   initialize a video recording tool within the container to receive the display rendering information and generate a video file based on the received display rendering information; and
   upon ending of the monitoring task, transmitting the video file to a client device.

10. The system of claim 9, further comprising analyzing the video file to determine whether the file is corrupted.

11. The system of claim 9, further comprising instructions, which when executed by the processor, cause the processor to generate a test log of the synthetic test comprising an indication of the performance of the synthetic test at one or more steps of the synthetic test.

12. The system of claim 11, further comprising instructions, which when executed by the processor, cause the processor to:

synchronize the video file of the recording with the test log; and insert markers in the video file at locations in the recording corresponding to the one or more steps of the synthetic test indicated in the test log.

13. The system of claim 12, further comprising instructions, which when executed by the processor, cause the processor to:

determine whether one or more steps of the synthetic test have failed; and upon determining that one or more steps of the synthetic test have failed, cropping the video file of the recording to retain portions of the recording corresponding to the one or more steps of the synthetic test that have failed.

14. The system of claim 9, further comprising instructions, which when executed by the processor, cause the processor to:

synchronize the video file of the recording with the test script; and insert markers in the video file at locations in the recording corresponding to one or more lines of code of the test script.

15. The system of claim 9, further comprising instructions, which when executed by the processor, cause the processor to:

determine whether a size of the video file exceeds a predetermined threshold size; and delete the video file upon determining that the size of the file exceeds the predetermined threshold size.

16. The system of claim 9, wherein the client application is a web browser.

* * * * *